Figure 1:
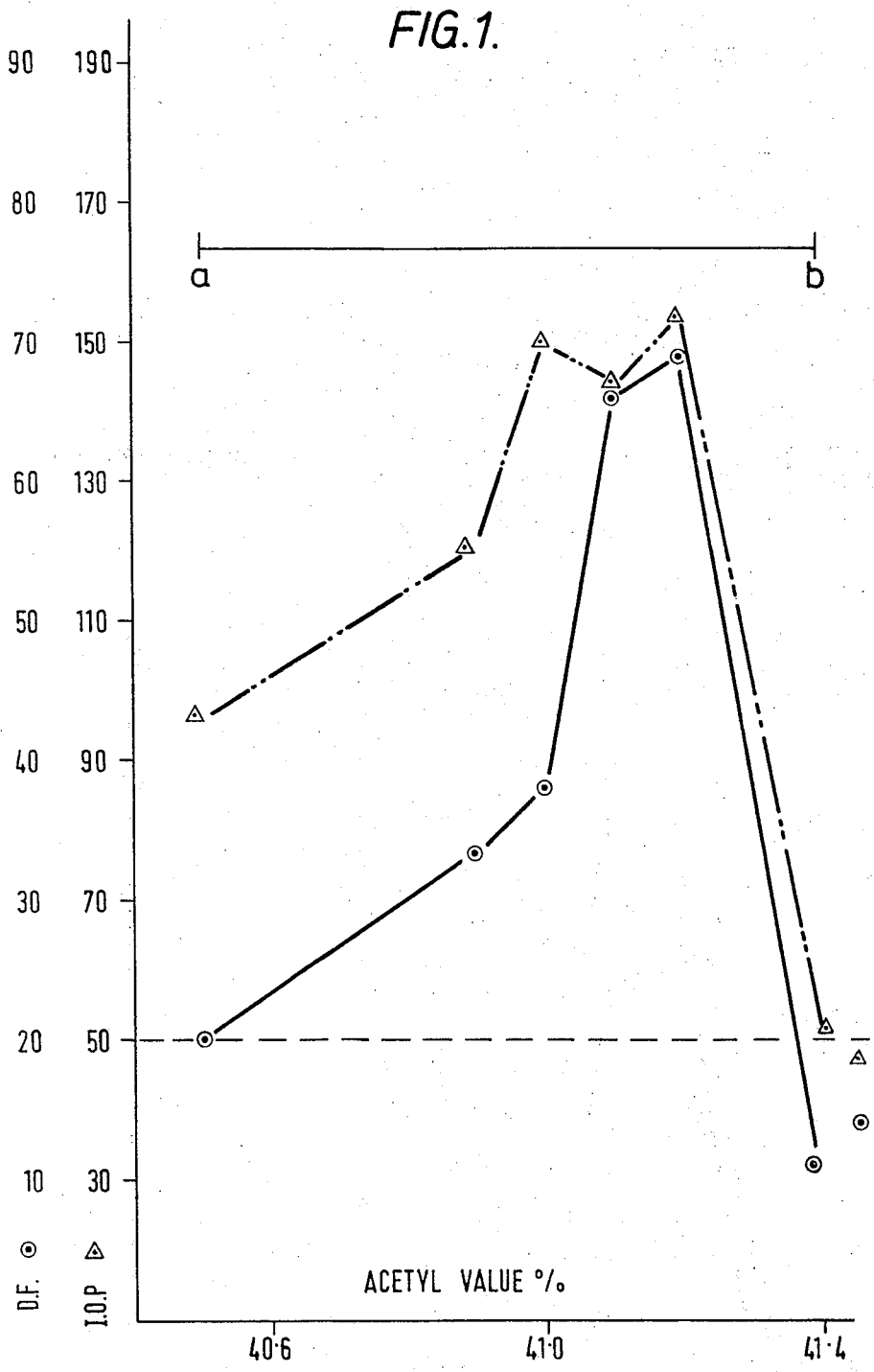

United States Patent
Walmsley

[11] 3,807,571
[45] Apr. 30, 1974

[54] MEMBRANES FOR REVERSE OSMOSIS
[75] Inventor: Dennis Walmsley, Didcot, England
[73] Assignee: United Kingdom Atomic Energy Authority, London, England
[22] Filed: Apr. 9, 1973
[21] Appl. No.: 349,470

[30] Foreign Application Priority Data
Apr. 12, 1972 Great Britain.................... 16968/72

[52] U.S. Cl................................. 210/500, 106/196
[51] Int. Cl............................................ B01d 39/00
[58] Field of Search...... 210/23, 321, 500; 106/196; 264/41, 49

[56] References Cited
UNITED STATES PATENTS
3,497,072  2/1970  Cannon.............................. 210/500

Primary Examiner—Frank A. Spear, Jr.
Assistant Examiner—Ferris Lander
Attorney, Agent, or Firm—Larson, Taylor and Hinds

[57] ABSTRACT

The invention comprises a cellulose acetate reverse osmosis membrane, a method of making such a membrane by casting and a solution suitable for use in casting such a membrane as a real composition of matter. The particular features of the invention lie in the selection of a narrow range of acetyl values for the cellulose acetate, obtained by blending cellulose acetates having acetyl values falling outside the selected range, and in the composition of the casting solution which included acetone dioxan and formamide. The membranes of the invention are further characterised in having Indices of Performance (I.O.P.) of at least 50 and frequently the I.O.P. is higher than 100.

12 Claims, 2 Drawing Figures

MEMBRANES FOR REVERSE OSMOSIS

This invention relates to reverse osmosis membranes, and particularly to such membranes formed of cellulose acetate. Such membranes are generally well known, and have, for example, been described by Loeb in U.S. Pat. Nos. 3,133,132 and 3,133,137. Standard preparative procedure involves the following steps:

1. Preparation of a suitable casting solution.
2. Casting the membrane onto a porous substrate.
3. Partial evaporation of the solvent by exposure to air.
4. Immersion in cold water to "gel" the cellulose acetate and to leach out the solvents.
5. Immersion in hot water to modify the physical properties of the membrane and thus enhance its separation properties.

The present invention is chiefly concerned with improvements in Stage 1 — Preparation of a suitable casting solution.

Cellulose acetate is commercially available in a number of grades with differing acetyl contents. Grades composed of cellulose diacetate generally have acetyl contents below about 40.0 percent by weight, such as for example the Eastman Kodak 394–30 grade, which has an acetyl content of 39.4 percent by weight. Grades composed of cellulose triacetate generally have acetyl contents above about 43.4 percent by weight. Grades of cellulose diacetate are soluble in common polar organic solvents, whereas grades of cellulose triacetate are not generally soluble in polar organic solvents apart from acetic acid but are commonly soluble in chlorinated solvents. While it is possible to form casting solutions containing blends of cellulose diacetate and cellulose triacetate, such blends are not entirely satisfactory owing to the differing solubility characteristics of the two materials. For these reasons, the use, for reverse osmosis membranes, of cellulose acetate having acetyl contents of between about 40.0 and 43.4 percent has been comparatively neglected.

The properties of a reverse osmosis membrane are usually expressed as the percentage salt rejection and product flux. The percentage salt rejection is $$\frac{\text{concentration of solute in feed} - \text{concentration of solute in product}}{\text{concentration of solute in feed}} \times 100$$

The product flux is the rate at which desalted water flows through unit area of membrane.

It has also been found convenient to express the salt rejection as a desalination factor (D.F.). This is defined as $$\frac{\text{concentration of solute in feed}}{\text{concentration of solute in product}}$$

Using the D.F. and product flux another value which has proved useful in characterising membranes can be calculated. This is the Index of Performance (I.O.P.) which is expressed as follows: $I.O.P. = 15.9 \times F \times DF^{0.62}$ where F is flux in $m^3/m^2$ day.

We have now surprisingly found that reverse osmosis membranes having a high I.O.P. can be made using cellulose acetate having a critical acetyl content within the neglected range indicated above.

Accordingly, the present invention provides, in one aspect, a reverse osmosis membrane having an I.O.P., as hereinbefore defined, of at least 50, formed from a solution of cellulose acetate comprising a blend of at least one cellulose acetate having an acetyl value of less than 40.9 percent and at least one cellulose acetate having an acetyl value of greater than 41.4 percent and having an acetyl content of from 40.9 to 41.4 percent in a mixture of acetone, dioxan and formamide, said solution having the composition:

| Cellulose acetate | 15.0% to 30.0% |
|---|---|
| Acetone | 15.0% to 50.0% |
| Dioxan | 10.0% to 45.0% |
| Formamide | 5.0% to 30.0% | all percentages being by weight on the weight of the solution.

The invention also provides, as a novel material in its own right, a casting solution of cellulose acetate comprising a blend of at least one cellulose acetate having an acetyl value of less than 40.9 percent and at least one cellulose acetate having an acetyl value greater than 41.4 percent and having an acetyl content of from 40.9 to 41.4 percent in a mixture of acetone, dioxan and formamide, said solution having the composition:

| cellulose acetate | 15.0% to 30.0% |
|---|---|
| acetone | 15.0% to 50.0% |
| dioxan | 10.0% to 45.0% |
| formamide | 5.0% to 30.0% | all percentages being by weight on the weight of the solution.

The cellulose acetate should preferably not contain any commercial cellulose triacetate grade. We have found that particularly good results may be obtained by using a blend of two or more different grades of cellulose acetate of differing acetyl contents. We particularly prefer to use a cellulose acetate having an acetyl content of from 40.9 to 41.2 percent formed by blending two grades of cellulose diacetate having acetyl contents of 39.4 percent and 42.1%.

For the casting solution, we use a mixture of acetone and dioxan with formamide as a modifier. The use of formamide has the advantage that the need for water and other swelling agents is avoided. We particularly prefer to use a casting solution of from 21 to 26 percent, e.g., 21.9 percent of the cellulose acetate in a solvent mixture having the composition:

| acetone | 23.2% to 37.6% |
|---|---|
| dioxan | 20.0% to 34.7%, particularly 28.0% to 32.0% |
| formamide | 10.0% to 21.3% | all percentages being by weight on the weight of the solution.

Within the ranges set out above, compositions may be chosen to provide a membrane giving high flux with moderate salt rejection or high salt rejection with moderate flux.

The solution may be cast onto a glass plate or onto a porous substrate, as is well known in the art. We prefer to cast the solution onto a paper or textile substrate which is then supported by a more rigid material such as perforated metal or porous or grooved plastics material. Casting conditions and the thickness of the cast film may suitably be those conventionally used for cellulose acetate membranes. The subsequent treatment of the cast film to develop its salt rejection properties, involving partial evaporation of the solvent, and immersion in cold and hot water, may suitably also be along the lines conventionally used for the preparation of reverse osmosis cellulose acetate membranes. The membranes of the invention are typically from $25\mu$ (0.001 in.) to $1250\mu$ (0.050 in.) thick, preferably $125\mu$ (0.005 in.) to $375\mu$ (0.015 in.). The normal structure of these membranes includes a relatively thin dense upstream layer associated with a relatively thick layer having a high proportion of void volume.

The invention will be more particularly described in the following examples.

Preparation of casting solution

The recipe was based on cellulose acetate/acetone/dioxan/formamide and the exact composition was varied to produce a membrane with the desired properties. Casting solutions were prepared from either a single cellulose acetate or a blend of two cellulose acetates.

Five grades of cellulose acetate were used. Two were standard production grades of acetate from Eastman Kodak, and three were 'specials' prepared by Lansil Ltd. These were:

| | |
|---|---|
| Eastman Kodak 394–30 | Acetyl value 39.4% |
| Eastman Kodak 398–3 | Acetyl value 39.8% |
| Lansil PP612 | Acetyl value 40.4% |
| Lansil PP628 | Acetyl value 41.5% |
| Lansil PP613 | Acetyl value 42.1% |

When a blend of Eastman Kodak and Lansil cellulose acetate was used, the solution was prepared by dispersing the latter in a mixture of acetone and formamide. After standing for 6 hours the dioxan was added and mixed by hand stirring. The Eastman Kodak was then added, followed by mixing on rollers for 24 hours. The difference between the Eastman Kodak cellulose acetates is that 398–3 has a slightly higher acetyl value and has a lower viscosity than 394–30 and the lower viscosity allows easier handling in some cases.

Using Lansil acetate only, the solution was prepared by stirring the powder into a mixture of the solvents. After standing for one hour the solution was mixed on rollers for 24 hours.

Application of membrane to substrate

Two substrates were used, Type R1 and R3. Type R1 consisted of a perforated stainless steel tube 0.625cm (0.25 in) diameter sleeved with braided terylene. Type R3 consisted of a grooved polypropylene rod 0.313cm (0.125in.) diameter sleeved with braided terylene.

The casting solution was deposited about 0.0375cm (0.015 in.) thick on the textile by passing the substrate assembly through an orifice mounted in a reservoir, this reservoir was kept full of casting solution by means of a pressure feed system. Following a very short period of evaporation in air the coated substrate was passed into a gelling bath, cooled to 0°–2°C. After a period of typically from 10 to 30 minutes the membraned substrate was removed from the gelling bath and heat treated at some temperature in the range 60°–85°C for a period of from 1 to 5 minutes.

Results and discussion

Membranes with a wide range of properties were prepared by varying the formulation of the casting solution. The membranes produced could be classified in the following three groups:
1. Salt rejection below 50 percent — Table 1.
2. Salt rejection between 50 and 90 percent — Table 2.
3. Salt rejection above 90 percent — Table 3.

The results given in the Tables are the average values for three membranes. In the Tables a number of results refer to non-blended cellulose acetates. These results are included for comparison.

1. Membranes with salt rejection below 50 percent

Four different formulations were used. Three were prepared from a blend of Eastman Kodak 394–30 and Lansil PP613 cellulose acetates. The average acetyl content of the blend was 40.9. The fourth formulation used was based on a single cellulose acetate, Lansil PP612 having an acetyl value of 40.4. The results are given in Table 1. These show that the three solutions where a blend was used produced membranes with very high fluxes. Although the salt rejections were low the membranes were considered good, having Indices of Performance ranging from 57 to 101. In contrast membranes made from a single cellulose acetate, Lansil PP612 were greatly inferior.

2. Salt rejection between 50 and 90 percent

Three casting solutions were prepared from a blend of Eastman Kodak 394–30 and Lansil PP613. A further three solutions were prepared using either Lansil PP613 or PP628 alone or a blend of PP612 and PP613.

The results are given in Table 2. Considering membranes made from a blend of Eastman Kodak 394–30 and Lansil PP613, the results show two casting solution formulations will produce a membrane with an Index of Performance above 50. In these solutions the formamide concentration was 10 percent or above. A third solution, in which the formamide concentration was 5 percent, produced a very poor membrane having an Index of Performance of only 15.

The results clearly show that using Lansil PP613 or PP628 alone or a blend of Lansil PP612 and PP613 the membranes produced give a much lower performance. The highest Index of Performance being 36, obtained when using a blend of Lansil PP612 and PP613.

3. Salt rejection above 90 percent

Table 3 shows 12 solutions which produced membranes with a performance in this category. However not all of them gave a satisfactory flux performance. The solutions giving satisfactory performance were based on blends of Eastern Kodak 394–30 and 398–3 and Lansil PP613 with formamide concentrations in the range 12.0 to 20.6 wt. %. Membranes made from Lansil PP628 gave a much lower flux and Index of Performance.

In the tables, the IOP values quoted refer to membranes cast onto and associated with a porous substrate and support. The performance of the membranes under these conditions, as measured by the IOP value, is, on average, 20 percent less than that measured under ideal conditions e.g., casting a membrane onto a smooth impervious glass or metal surface and measuring the characteristics of the isolated membrane. The principal factor in the difference is that with the membrane on a substrate, the flux is reduced significantly. This phenomenon is known and is believed to be a result of the physical obstruction to water flow presented by the substrate and associated mounting apparatus.

TABLE 1

Membranes with salt rejections below 50%

| Cellulose Acetate | | | Acetyl Value of Blend | Acetone wt. % | Dioxan wt. % | Formamide wt. % | Salt Rejection % | D.F. | Flux $m^3/m^2d$ | I.O.P. |
|---|---|---|---|---|---|---|---|---|---|---|
| Type | Acetyl Value | wt. % | | | | | | | | |
| 394.30 | 39.4 | 8.6 | 40.9 | 23.2 | 35.3 | 21.3 | 8.0 | 1.1 | 6.10 | 101 |
| PP613 | 42.1 | | | | | | | | | |
| 394.30 | 39.4 | 9.3 | 40.9 | 29.5 | 28.0 | 20.6 | 48 | 1.9 | 2.44 | 57 |
| PP613 | 42.1 | | | | | | | | | |
| 394.30 | 39.4 | 9.0 | 40.9 | 28.0 | 34.7 | 16.0 | 41 | 1.7 | 3.02 | 66 |
| PP613 | 42.1 | | | | | | | | | |
| PP612 | 40.4 | 21.9 | — | 37.6 | 28.0 | 12.5 | 17 | 1.2 | 0.78 | 14 |

TABLE 2

Membranes with salt rejections between 50% and 90%

| Cellulose Acetate | | | Acetyl Value of Blend | Acetone wt. % | Dioxan wt. % | Formamide wt. % | Salt Rejection % | D.F. | Flux $m^3/m^2d$ | I.O.P. |
|---|---|---|---|---|---|---|---|---|---|---|
| Type | Acetyl Value % | wt. % | | | | | | | | |
| 394.30 | 39.4 | 9.0 | 40.9 | 38.9 | 34.8 | 5.0 | 55 | 2.2 | 0.54 | 15 |
| PP613 | 42.1 | | | | | | | | | |
| 394.30 | 39.4 | 9.0 | 40.9 | 33.4 | 35.3 | 10.0 | 89 | 9.1 | 0.98 | 66 |
| PP613 | 42.1 | | | | | | | | | |
| 394.30 | 39.4 | 9.0 | 40.9 | 31.4 | 34.8 | 12.5 | 90 | 10 | 1.47 | 97 |
| PP613 | 42.1 | | | | | | | | | |
| PP613 | 42.1 | 21.9 | — | 37.6 | 28.0 | 12.5 | 90 | 10 | 0.44 | |
| PP628 | 41.5 | 21.2 | — | 31.5 | 34.8 | 12.5 | 70 | 3.3 | 0.73 | |
| PP612 | 40.4 | 14.0 | 40.9 | 37.6 | 28.0 | 12.5 | 90 | 10 | 0.54 | 36 |
| PP613 | 42.1 | 7.9 | | | | | | | | |

TABLE 3

| Cellulose Acetate | | | Acetyl Value of Blend % | Acetone wt. % | Dioxan wt. % | Formamide wt. % | Salt Rejection % | D.F. | Flux $m^3/m^2d$ | I.O.P. |
|---|---|---|---|---|---|---|---|---|---|---|
| Type | Acetyl Value % | wt. % | | | | | | | | |
| 394.30 | 39.4 | 9.3 | 40.9 | 42.5 | 20.6 | 15.0 | 96 | 25 | 1.15 | 134 |
| PP613 | 42.1 | | | | | | | | | |
| 394.30 | 39.4 | 9.3 | 40.9 | 33.6 | 32.0 | 12.5 | 98.3 | 60 | 0.89 | 180 |
| PP613 | 42.1 | | | | | | | | | |
| 394.30 | 39.4 | 9.3 | 40.9 | 37.6 | 20.0 | 20.5 | 93 | 14.3 | 1.27 | 104 |
| PP613 | 42.1 | | | | | | | | | |
| 394.30 | 39.4 | 9.8 | 40.9 | 37.2 | 27.6 | 12.2 | 98 | 50.0 | 0.66 | 118 |
| PP613 | 42.1 | | | | | | | | | |
| 398.3 | 39.4 | 10.6 | 41.0 | 36.1 | 26.9 | 12.0 | 98.9 | 90.0 | 0.62 | 158 |
| PP613 | 42.1 | | | | | | | | | |
| 398.3 | 39.4 | 11.0 | 41.1 | 33.5 | 28.0 | 12.5 | 98.8 | 83 | 0.47 | 117 |
| PP613 | 42.1 | | | | | | | | | |
| 398.3 | 39.4 | 10.6 | 41.0 | 34.5 | 28.0 | 12.5 | 98 | 50 | 0.90 | 164 |
| PP613 | 42.1 | 14.6 | | | | | | | | |
| 394.30 | 39.4 | 12.6 | 40.5 | 37.6 | 28.0 | 12.5 | 95 | 20 | 0.94 | 96 |
| PP613 | 42.1 | | | | | | | | | |
| 394.30 | 39.4 | 9.3 | 40.9 | 37.6 | 28.0 | 12.5 | 97 | 33.3 | 0.85 | 120 |
| PP613 | 42.1 | | | | | | | | | |
| 394.30 | 39.4 | 8.8 | 41.0 | 37.6 | 28.0 | 12.5 | 97.4 | 38 | 1.00 | 150 |
| PP613 | 42.1 | | | | | | | | | |
| 394.30 | 39.4 | 7.8 | 41.1 | 37.6 | 28.0 | 12.5 | 98.2 | 66 | 0.73 | 142 |
| PP613 | 42.1 | | | | | | | | | |
| 394.30 | 39.4 | 7.0 | 41.2 | 37.6 | 28.0 | 12.5 | 98.3 | 69 | 0.76 | 152 |
| PP613 | 42.1 | | | | | | | | | |
| 394.30 | 39.4 | 5.6 | 41.4 | 37.6 | 28.0 | 12.5 | 91 | 11.1 | 0.73 | 51 |
| PP613 | 42.1 | | | | | | | | | |
| PP628 | 41.5 | 21.9 | 41.5 | 37.6 | 28.0 | 12.5 | 93 | 14.3 | 0.54 | 49 |

In addition to these tables further results are indicated in the accompanying drawings. These drawings take the form of graphs illustrating how alteration of various parameters of the casting solution affects the properties of the cast membrane.

FIG. 1 shows the variation of Desalination Factor and I.O.P. for membranes cast from solutions wherein the only variable is the Acetyl Value of the Cellulose Acetate used. The casting solution composition used was:

| Cellulose Acetate | 21.9 wt. % |
|---|---|
| Formamide | 12.5 wt. % |
| Dioxan | 28.0 wt. % |
| Acetone | 37.6 wt. % |

The Cellulose Acetates used were blends of Eastman Kodak 394–30 and Lansil PP613 mixed so as to produce blends with differing acetyl values.

This graph clearly illustrates how the performance of the membranes varies with acetyl value having a peak at acetyl value 41.1 to 41.2.

The range shown as $a - b$ in FIG. 1 indicates the range of blends of Eastman Kodak 394–30 and Lansil PP613. A single result for PP628 is shown for comparison.

Also on FIG. 1 the I.O.P. = 50 line is shown dotted and with reference to this line it can clearly be seen how the performance of the membranes varies with acetyl value of the cellulose acetate.

Figure 2:
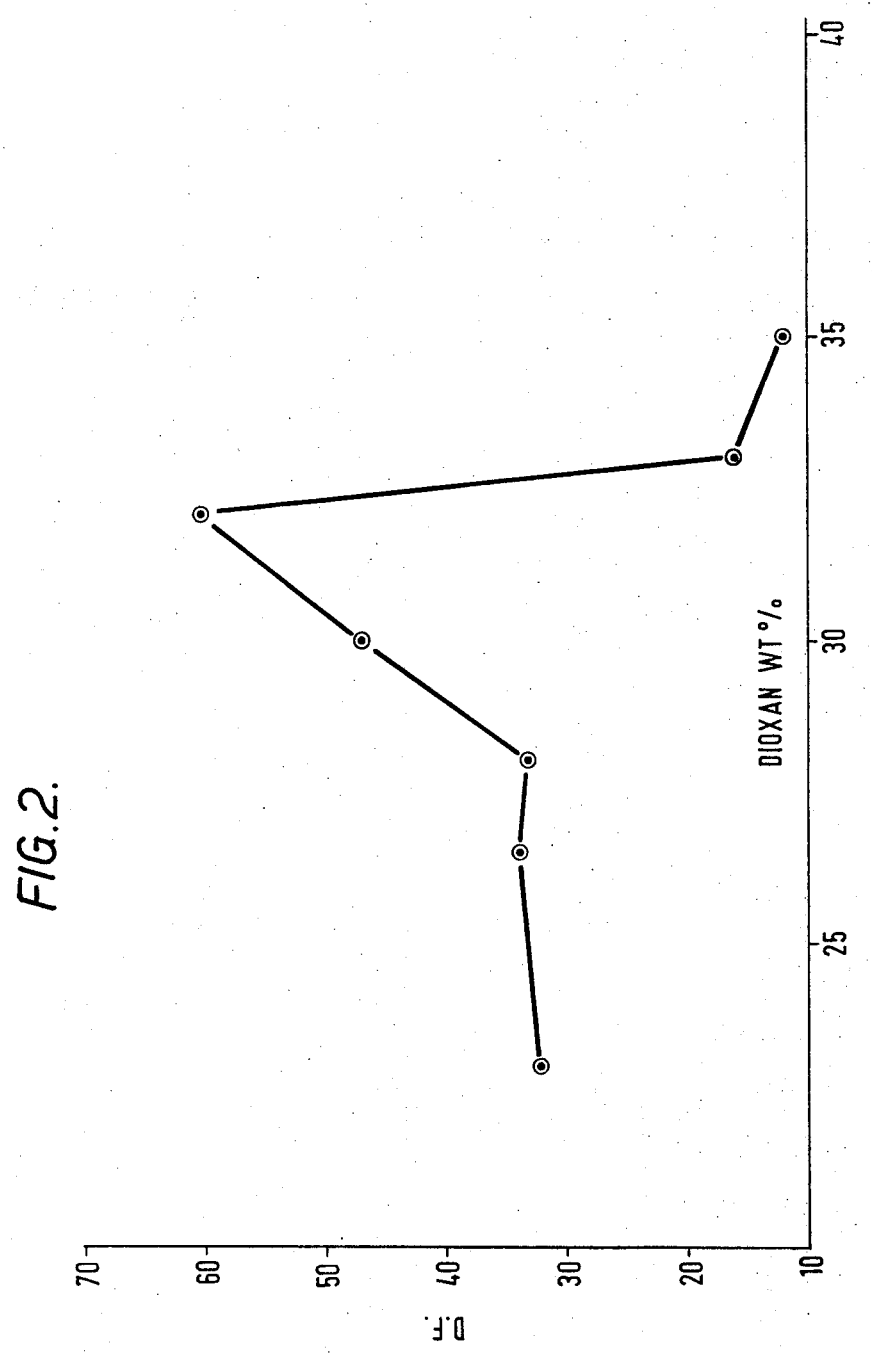

FIG. 2 shows how the membrane properties vary with a change in dioxan concentration in the casting solutions. The composition of the casting solutions were:

| Cellulose Acetate | 21.9 wt. % |
|---|---|
| Formamide | 12.5 wt. % |
| Acetone + Dioxan | 65.6 wt. % |

The cellulose acetate used was a blend of Eastman Kodak 394–30 and Lansil PP613 and had an acetyl value of 40.9.

The D.F.'s and fluxes at the varying dioxan weight percentages were measured to give the following results.

TABLE 4

| Dioxan wt. % | Acetone wt. % | D.F. | Flux $m^3/m^2$ day |
|---|---|---|---|
| 23 | 42.6 | 32 | 0.54 |
| 26.5 | 39.1 | 34 | 0.68 |
| 28.0 | 37.6 | 33.3 | 0.85 |
| 30 | 35.6 | 47 | 0.86 |
| 32 | 33.6 | 60 | 1.00 |
| 33 | 32.6 | 16 | 1.36 |
| 35 | 30.6 | 12 | 1.46 |

The D.F. values show a very noticeable peak at about dioxan = 32 wt. %. This can be clearly seen in FIG. 2. The flux values increase fairly steadily with dioxan wt. %. Thus the most useful membranes were obtained when the casting solution contained about 32 wt. % dioxan.

I claim:

1. In a cellulose acetate reverse osmosis membrane cast from a cellulose acetate casting solution the improvement which consists in that the membrane has an I.O.P. of at least 50, the cellulose acetate consists essentially of from 25.6–63.9 percent by weight of at least one cellulose acetate having an acetyl value of less than 40.9 percent and from 74.4–36.1 percent by weight of at least one cellulose acetate having an acetyl value greater than 41.4 percent and has an acetyl value of from 40.9 to 41.4 percent and the casting solution has the following composition:

| cellulose acetate | 15.0% to 30.0% |
|---|---|
| acetone | 15.0% to 50.0% |
| dioxan | 10.0% to 45.0% |
| formamide | 5.0% to 30.0% | all percentages being by weight on the weight of the solution.

2. A cellulose acetate reverse osmosis membrane as claimed in claim 1 having an acetyl value of from 40.9 to 41.2 percent.

3. A cellulose acetate reverse osmosis membrane as claimed in claim 1 wherein the casting solution comprises from 21.0 to 26.0 percent by weight of the cellulose acetate.

4. A cellulose acetate reverse osmosis membrane as claimed in claim 1 wherein the casting solution comprises from 23.2 to 37.6 percent by weight of acetone.

5. A cellulose acetate reverse osmosis membrane as claimed in claim 1 wherein the casting solution comprises from 20.0 to 34.7 percent by weight of dioxan.

6. A cellulose acetate reverse osmosis membrane as claimed in claim 5 wherein the casting solution comprises from 28.0 to 32.0 percent by weight of dioxan.

7. A cellulose acetate reverse osmosis membrane as claimed in claim 1 wherein the casting solution comprises from 10.0 to 21.3 percent by weight of formamide.

8. A membrane as claimed in claim 1 from 25 to 500$\mu$ thick.

9. A membrane as claimed in claim 8 wherein the membrane is from 125 to 375$\mu$ thick.

10. In a method of casting cellulose acetate reverse osmosis membranes from cellulose acetate casting solutions the improvement which consists in using cellulose acetate consists essentially of from 25.6–63.9 percent by weight of at least one cellulose acetate having an acetyl value of less than 40.9 percent and from 74.4–36.1 percent by weight of at least one cellulose acetate having an acetyl value greater than 41.4 percent and having an acetyl value of from 40.9 to 41.4 percent, and the casting solution having the following composition:

| cellulose acetate | 15.0% to 30.0% |
|---|---|
| acetone | 15.0% to 50.0% |
| dioxan | 10.0% to 45.0% |
| formamide | 5.0% to 30.0% | all percentages being by weight on the weight of the solution.

11. A method as claimed in claim 10 wherein the acetyl value of the cellulose acetate is from 40.9 to 41.2 percent and the casting solution has the following composition:

| cellulose acetate | 21.0% to 26.0% |
|---|---|
| acetone | 23.2% to 37.6% |
| dioxan | 20.0% to 34.7% |
| formamide | 10.0% to 21.3% | all percentages being by weight on the weight of the solution.

12. As a new composition of matter the solution comprising cellulose acetate consisting essentially of from 25.6–63.9 percent by weight of at least one cellulose acetate having an acetyl value of less than 40.9 percent and from 74.4–36.1 percent by weight of at least one cellulose acetate having an acetyl value greater than 41.4 percent and having an acetyl value of from 40.9 percent to 41.4 percent and having the following composition:

| | |
|---|---|
| cellulose acetate | 15.0% to 30.0% |
| acetone | 15.0% to 50.0% |
| dioxan | 10.0% to 45.0% |
| formamide | 5.0% to 30.0% | all percentages being by weight on the weight of the solution.

* * * * *